United States Patent

Anstee

[15] 3,641,754
[45] Feb. 15, 1972

[54] GRASS AND LEAF PACKAGING MACHINE

[72] Inventor: Leon L. Anstee, Leola, Pa.
[73] Assignee: Sperry Rand Corporation, New Holland, Pa.
[22] Filed: July 22, 1970
[21] Appl. No.: 57,248

[52] U.S. Cl. ..................................56/341, 56/2, 56/12.7, 56/169
[51] Int. Cl. ..........................................A01d 39/00
[58] Field of Search..................56/341, 343, 364, 202, 12.7, 56/2

[56] References Cited

UNITED STATES PATENTS

| | | | |
|---|---|---|---|
| 3,552,109 | 1/1971 | Murray et al. | 56/343 |
| 3,229,320 | 1/1966 | Cymara | 56/202 X |
| 3,055,162 | 9/1962 | Phillips | 56/364 |
| 3,487,613 | 1/1970 | Hollyday | 56/341 X |
| 3,242,658 | 3/1966 | Morales | 56/202 X |
| 2,696,777 | 12/1954 | Sutch | 56/341 X |

Primary Examiner—Louis G. Mancene
Assistant Examiner—J. N. Eskovitz
Attorney—Joseph A. Brown, John C. Thompson, James J. Kennedy and George C. Bower

[57] ABSTRACT

A machine adapted to collect and package grass and leaf materials as it moves across the ground behind a towing implement using pickup means to lift material from the ground and direct the material upwardly and rearwardly to a shredding unit and then to a pair of consolidating augers which convey the material inwardly of the machine to the collecting means where it is compacted and packaged in easily handled containers.

12 Claims, 10 Drawing Figures

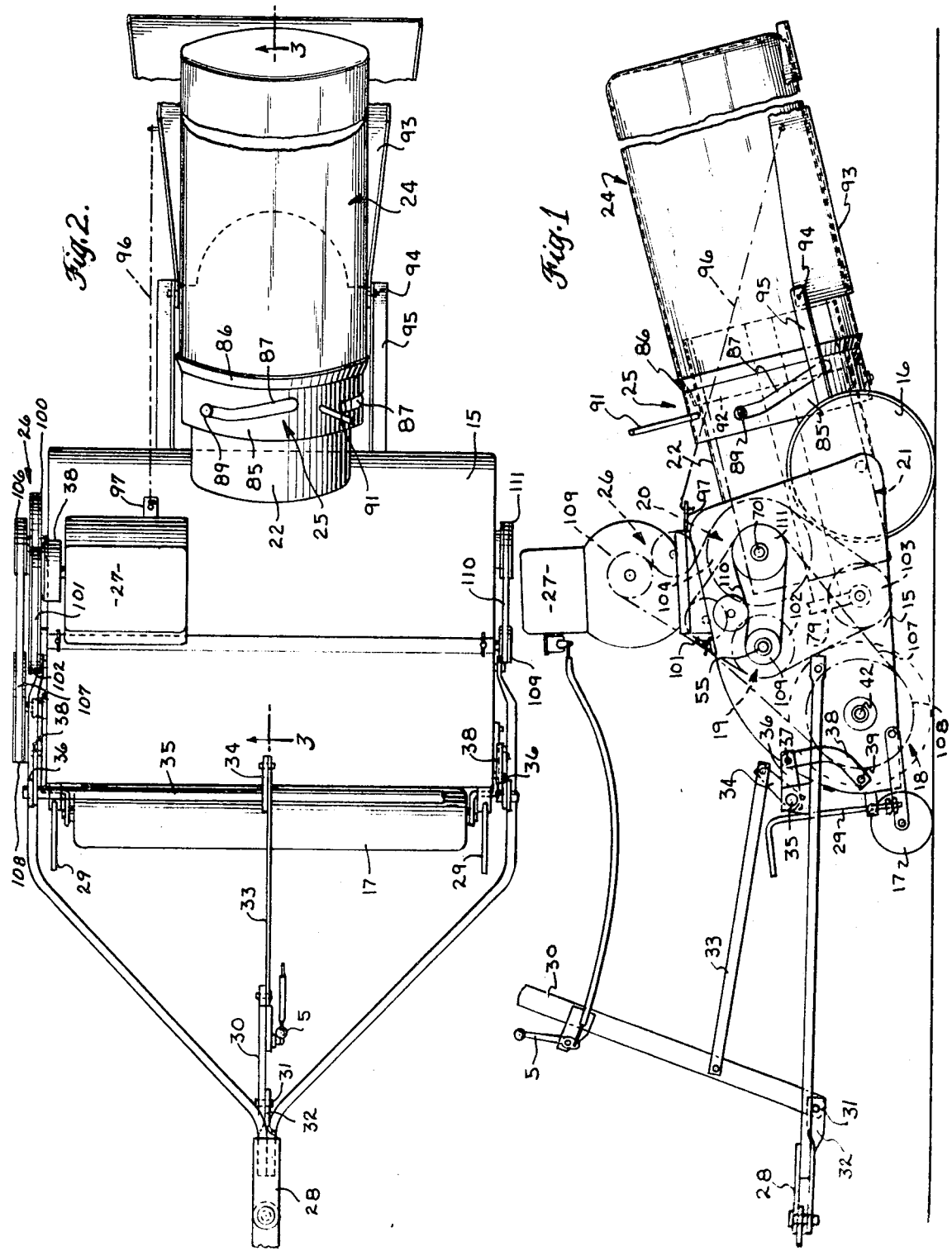

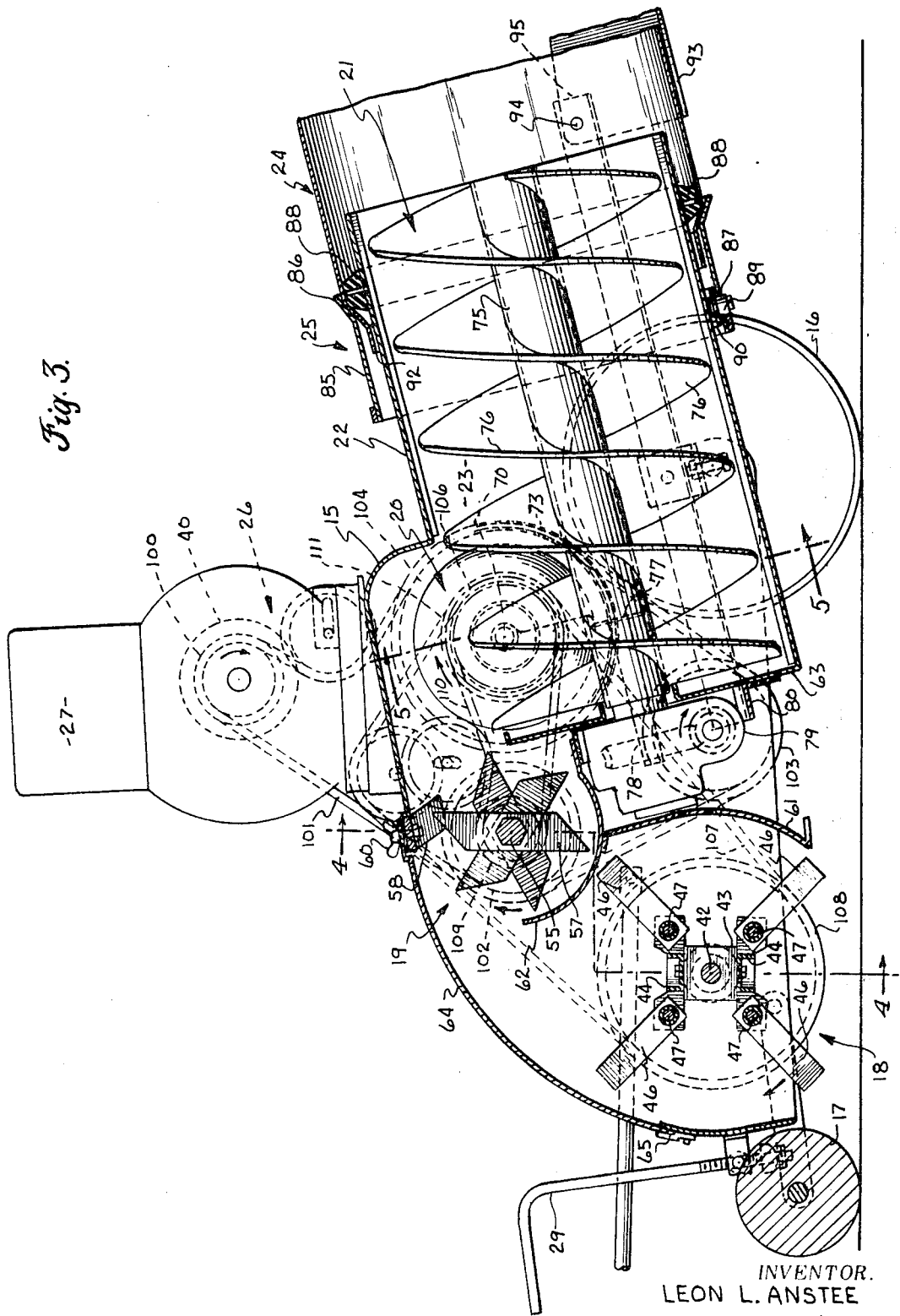

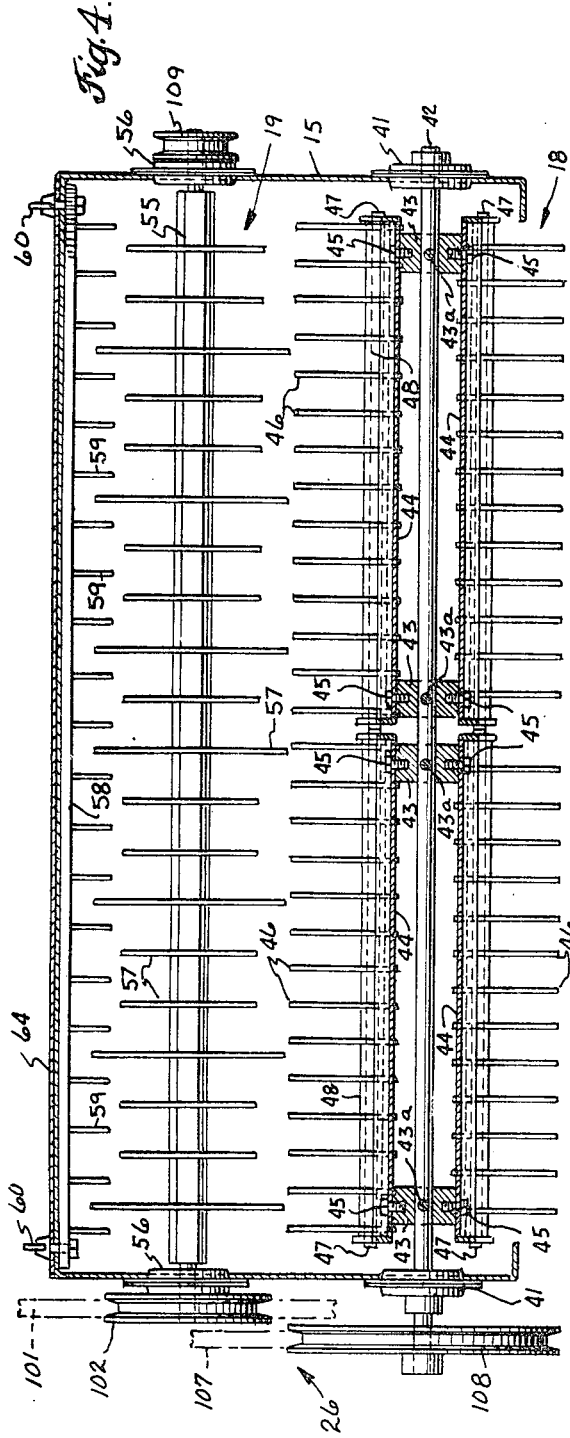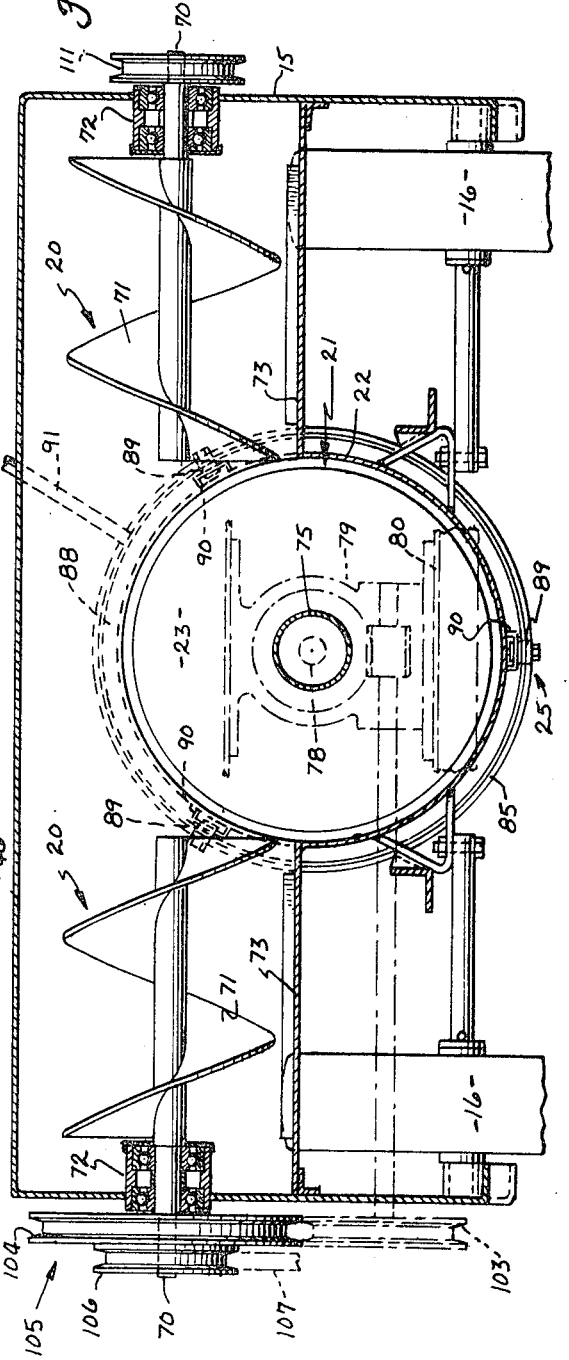

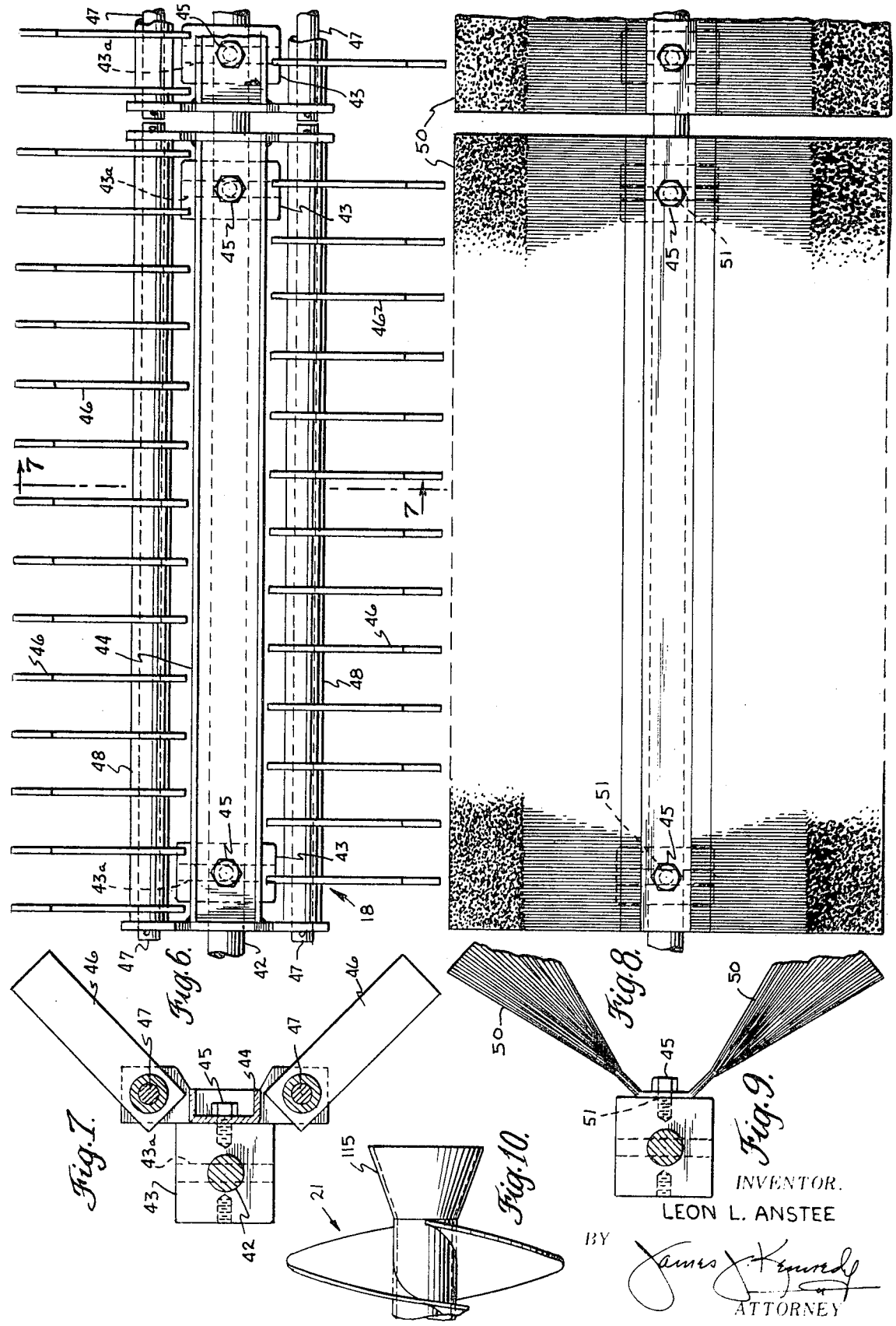

GRASS AND LEAF PACKAGING MACHINE

BACKGROUND OF THE INVENTION

This invention relates generally to lawn and garden equipment and specifically to grass and leaf-packaging machinery.

The trend in recent years has been toward greater mechanization of all types of jobs, especially the more customary and tedious jobs. One such job known to all who have a lawn to keep is picking up the lawn or yard grass clippings after mowing or leaves in the summer and fall. While many attempts have been made to mechanize this predominantly summertime weekly project, there is still a great deal of physical labor involved and the capacity of the machines have left much to be desired.

Many of the prior art devices collected the grass and leaf materials in bags which have to be emptied quite frequently at some suitable location. In the past, the easiest way to dispose of the accumulated clippings was to burn them. Now, however, many states and municipalities have enacted laws and ordinances which prohibit open burning of any kind. Similar laws are coming into being in many other locales and, therefore, the need for some conveniently handled disposal package containing these clippings is becoming increasingly necessary.

So that the materials may be picked up by refuse collectors, they must be easily transportable in some suitable type of container. One such container is the heavy duty, all-purpose plastic bag which is now available in most supermarkets and lawn and garden supply centers. This type of container affords a convenient way of packaging grass and leaves for subsequent transport and disposal. The problem has been, however, to readily adapt some sort of mechanized equipment to handle such bags and to automatically pick the material up from the ground and insert it in the bag.

It is therefore, the primary object of this invention to mechanically pick up grass and leaf material from the ground and form it into a consolidated and compacted mass that can be easily packaged and disposed of in packaged form.

Another object of the invention is to provide interchangeable pickup means so that the material may be picked up by flail means or by means of a brush.

Another object of the invention is to provide an auxiliary shredding of the material after it has been picked up from the ground to further chop the material so that subsequent compaction may be more effectively carried out.

A further object is to provide an easily operated mobile apparatus having quick positive clamping means thereon so that the collecting receptacle is securely held in place as it is filled with material and can be subsequently easily removed and replaced.

These and other objects of the invention will become apparent from the foregoing and the detailed description of the invention to follow.

BRIEF DESCRIPTION OF THE DRAWINGS

FIG. 1 is a side elevational view of a grass and leaf-packaging machine constructed in accordance with the invention with certain parts which appear in detail in the other figures indicated diagrammatically;

FIG. 2 is a plan view of FIG. 1;

FIG. 3 is a somewhat enlarged sectional view taken approximately along line 3—3 of FIG. 2;

FIG. 4 is a cross section taken approximately along the line 4—4 of FIG. 3;

FIG. 5 is a cross section taken approximately along the line 5—5 of FIG. 3;

FIG. 6 is an enlarged detailed view illustrating a unitary, readily replaceable flail pickup means employed with the apparatus;

FIG. 7 is a cross section taken on the line 7—7 of FIG. 6;

FIG. 8 is a view similar to FIG. 6 illustrating a brush unit as a pickup means which may be readily applied to replace the flail unit of FIG. 6;

FIG. 9 is an end view of FIG. 8; and

FIG. 10 is a fragmentary view of a modification of the compression auger.

DESCRIPTION OF PRIMARY EMBODIMENT

The mobile grass and leaf-packaging apparatus of the present invention comprises, in general, a housing or casing 15 mounted on rearwardly disposed wheels 16 and a forwardly disposed roller 17, a main flail pickup 18, a shredder unit 19, a pair of transverse consolidating augers 20, a compression auger 21, a cylindrical housing or tube 22 in which the compression auger is mounted and in which a compression chamber 23 is formed, a disposable receptacle container 24 for receiving the compacted, shredded material from the compression auger 21, a cylindrical clamping element 25 for firmly clamping the bag in place, a drive system, indicated generally by numeral 26, a power source for the apparatus, such as a gasoline engine 27 or the like, and a hitch 28 for attachment of the equipment to a towing tractor or other type vehicle. By this method of construction it will be readily understood by those skilled in the art that a prime mover is necessary to move this apparatus across the ground, but power to operate the various elements of the apparatus are supplied by self contained power source 27.

In FIGS. 1 and 3 of the drawings, the grass and leaf-packaging machine is illustrated in its operative position, i.e., with the roller 17 placed in ground contact by means of control handle 30. The control handle 30 is pivoted at 31 on a frame member 32 of the apparatus. This frame member 32 extends rearwardly where it is connected to the apparatus casing 15 and forwardly to the hitch position 28 which provides the connection of the apparatus to the towing vehicle to make the apparatus mobile. The control handle 30 is connected to casing 15 by means of a link member 33, a bellcrank 34, a transversely extending shaft 35, arms 36 fixed to both ends of a shaft 35, and a link 38 pivotally connected to arms 36 at 37 and to the casing or housing at 39. A lever 5 for controlling the throttle of the engine 27 is mounted on the control handle 30 as shown in FIGS. 1 and 2. The roller 17 is adapted to be adjusted for various ground contours so that the operative height of the machine may be varied by means of adjusting screws 29 which are disposed at either side of the rollers 17.

When it is desired to transport the apparatus from one place to another with the operating units idle, the control handle 30 is moved forwardly to raise the transversely extending roller 17 above the ground. It should be noted, that in this position of the control handle, the bellcrank 34 and the arms and links 36 and 38, respectively, are shifted to an overcenter position which locks the apparatus in the transport position until the lever 30 is again activated.

Before describing the grass and leaf-packaging machine in detail, the function of the various components of the apparatus will be briefly described.

With the engine running, the packaging device is towed along behind a tractor or other suitable vehicle and the grass and leaf material is drawn up into casing 15 by the pickup means 18 or 49 and then it is directed upwardly and rearwardly to the auxiliary booster shredder unit 19 where the material is further chopped and the picked-up particles are further reduced in size. From the shredding unit 19, the material is directed into the consolidating means which is comprised of a pair of transversely disposed augers 20,20 which feed the chopped material inwardly of the machine casing 15 toward and into the entrance or inboard ed of the centrally disposed consolidating means which includes the compression chamber 23. The consolidating means further comprises a rearwardly disposed compacting auger 21 which feeds the material rearwardly and tightly compresses the material into a suitable disposable bag or container 24. When the bag is full of tightly compressed material, the torque on the compacting auger drive increases to the point where a friction clutch 40, of any suitable known type, associated with the output shaft of the engine will begin to slip. At this point the machine must be stopped and the full bag removed from the machine. This is done quickly and easily by means of the release-clamping means 25 so that the full bag is removed and a new empty bag inserted in its place.

The main flail unit 18 is rotatably mounted in the casing 15 by means of bearings 41,41 and the unit is comprised of a transversely extending shaft 42, a plurality of blocks 43, as shown in FIGS. 4 and 7, which are secured in spaced apart relation along shaft 42 by means of pins 43a, longitudinally extending channel members 44,44 secured to adjacent blocks 43, as shown in the figures, by bolts 45, and a multiplicity of flail elements 46 mounted for free-swinging movement on longitudinally extending rods 47,47 carried by channel members 44,44. The flails 46 are mounted in spaced-apart relation along shaft 47 by means of spacer units 48. It should be noted, that in the various figures, the flail members 46 are shown in the position that they assume when the flail shaft is rotating and the machine is in its operative position.

Referring particularly to FIGS. 4, 6 and 7, those skilled in the art will realize that the flail pickup unit 18 includes four sets of unitary, readily removable flails, each set comprising a channel member 44, flail rods 47, flails 46 and spacer collars 48. This construction is advantageous in that the sets can be readily removed for replacement in the event of wear or breakage during normal operation by merely moving the two securing bolts 45,45. This unitary construction also simplifies the assembly operations when the machine is initially put together.

An alternate pickup means 49 may be easily substituted for the flail pickup means 18 under certain operative conditions and when it is desired to package certain kinds of material. The alternate pickup means 49 comprises a plurality of brush elements 50, as shown in FIGS. 8 and 9, formed in strip fashion and having holds 51,51 disposed in the strip and spaced-apart relation at a distance which corresponds to the spacing of the bolts 45,45, shown in FIG. 6. With this means of construction, the equipment can be easily and quickly converted from the flail operation to a brushing operation by means of the removal of the bolts 45 and exchanging parts.

Referring now particularly to FIGS. 3 and 4, the auxiliary shredding unit 19 includes a transversely extending hexagonal shaft 55 which is rotatably mounted in casing 15 by bearings 56,56, a plurality of radially disposed rotating shredder blades 57 secured on shaft 55 in longitudinally spaced-apart relation and an upper transverse bar 58 having a plurality of downwardly extending comb or teeth members 59 which are spaced to correspond with the spacing of blades 57 and to be positioned therebetween. The bar 58 is detachably secured to the casing by means of wingnuts 60 so that it may be readily replaced.

It will be seen, upon inspection of FIG. 3, that the casing 15 is provided with inner walls or partitions 61, 62 and 63 to provide the proper passage and guidance of material from the flail unit through the shredder unit 19 toward compression chamber 23. Also, to effectively guide the material, the outer wall 64 of casing 15 has a curved contour. This curved portion 64 is preferably in the form of a removable access cover fitting in a clip 65 fixed at the bottom of the machine and fastened securely in place at the top by the wingnut 60.

Referring now specifically to FIGS. 3 and 5, the consolidating means is comprised of the transversely disposed augers 20,20, rotatably mounted shafts 70 and auger flighting 71. The auger flighting 71 is such that when viewed in FIG. 5, the right-handed auger carries a left-handed flight and the left-handed auger carries a right-handed flight so that the material is fed inwardly from the sidewalls of the casing 15 toward an opening formed in contoured floor pan 73,73 which is disposed beneath augers 20,20. The opening formed in the floor pan is disposed centrally of the machine casing directly above the inboard end of the compression chamber 23. The shafts 70,70 of the augers are rotatably cantilever mounted and double bearings 72,72 supported in the sidewalls of the casing structure. It is also contemplated, in some instances, to provide a single continuous transverse auger extending from sidewall to sidewall of the casing and having right- and left-hand flights as above described, in which case the auger would be mounted sufficiently high so that the shaft would clear the flights of the compacting auger 21.

The rearwardly extending, centrally disposed collecting means of this mobile apparatus is comprised of a compression or compacting auger 21 which includes a tubular core member 75 and double auger flighting 76,76, an enlarged slug 77, an output shaft 78, a worm gear unit 79, a cylindrical housing 22, the clamping element 25 and the disposable container or bag 24. The inboard end of the central core 75 of compression auger 21 is secured to the enlarged slug 77. The slug 77 is of appreciable length and is secured to the output shaft 78 of the worm gear drive unit 79. The worm gear unit 79 is rigidly mounted on supports 80 of the casing structure. Thus, a rugged cantilever mounting is provided for the compression auger.

As seen in FIGS. 1, 2 and 3, the bag-clamping and supporting structure includes a disposable or other suitable type throwaway bag 24 which may be either readily available polyethylene or heavy paper bag, a clamping device 25 in the form of a cylindrical clamping ring 85 having a flared portion 86 at one end thereof, a plurality of diagonal slots 87, a ring 88 comprised of resilient material such as commercial V belting secured to the periphery of the auger housing 22 at a point adjacent to the clamping ring 85, rollers 89 operating in the diagonal slots 87 and carried by brackets 90 secured on cylindrical housing 22 at evenly spaced points, and an operating handle 91 for oscillating the clamping ring 85.

When the clamping ring is oscillated in one direction, to the position shown in FIGS. 1 and 2, the flared portion 86 of the clamping ring 85 firmly engages and clamps the open end portion 92 of the container between the flare and resilient ring 86. In this manner, the disposable container is able to resist the forces resulting from the tightly compressed material being forced into it by a compression auger 21. By simply oscillating the handle 91 in the opposite direction the filled bag is freed and can be removed and replaced by an empty one.

While the machine is in its operable condition moving forwardly over the ground behind the towed vehicle, the bag is supported by a rearwardly extending tray 93 which is pivotally mounted at 94 on a frame member 95 which extends rearwardly from casing 15. The tray can be adjusted to a plurality of desired angles by means of a chain 96 which is releasably anchored in a bayonet-type clip 97 in a known manner. The tray and the chain support are clearly shown in FIGS. 1 and 2.

The drive system 26 of the apparatus includes a friction clutch 38 disposed on the engine output shaft and a drive pulley 100 on the engine output shaft drivingly connected to the shredder unit 19 by means of a belt 101 and pulley 102. The input shaft of the worm gear unit 79 is driven by belt 101 turning pulley 103. The left-hand transverse auger 20 is also driven by belt 101 through the larger pulley 104 of a compound pulley unit 105. Driving force is transmitted from the smaller pulley 106 of compound pulley 105 to the pickup unit by means of a belt 107 and pulley 108. The right-hand transverse auger 20 is driven by means of a pulley 109 on the shredder shaft 55, belt 110 and pulley 111 on the right-hand auger shaft 70. It should be noted that in order to have the complete drive system appear in FIG. 3, the pulley 109, belt 110 and pulley 111 are indicated in a dot-dash lines since they are located in front of the plane of the section.

In FIG. 10, a modified form of the compression auger 21 is illustrated in which an outwardly flared cone 115 is provided at the discharge end of the auger as an aid in effectively distributing the material as it passes into the bag. This construction is of particular advantage when the apparatus is being used to package wet materials.

In operation, the apparatus is attached to a towing implement and the engine 27 is started to provide motive power to the various elements of the machine. Lever 30 is activated to place the machine in the operative position and the appropriate pickup means, either the flail unit 18 or the brush unit 49, is installed in the machine and the machine is drawn forwardly over the ground. When the flail unit is used, the flails sever and lift material from the ground upwardly into the machine and direct the material toward the consolidating means. As the material is moving toward the consolidating means it is first intercepted by the shredding unit 19 where it is further reduced and chopped and then it is fed directly into the consolidating augers which move the material inwardly toward the opening in the pan 73. Because the collecting means is disposed below the opening and because the opening of the collecting means corresponds to the opening in the pan, all the material is fed into the collecting means and then rearwardly by the compacting auger into the disposable container. The container 24 is connected to the apparatus by means of a clamping means 25. Actuation of handle 91 on the clamping means 25 causes the clamping means to rotate in one direction or the other so that the flared portion 86 and the resilient ring 88 either grasp the forward edge of the container therebetween to hold it in place or they release it so that the container may be removed.

While this invention has been described in connection with several embodiments thereof, it will be understood that these embodiments are capable of modification and that this application is intended to cover any variations, uses, or adaptations following, in general, the principles of the invention and including such departures from the present disclosure as come within the known or customary practice in the art to which the invention pertains, and as falls in the scope of the invention or the limits of the appended claims.

What I claim is:

1. Mobile apparatus for collecting grass and leaf material comprising, in combination, a housing; pickup means mounted in said housing for lifting material from the ground as the apparatus moves thereacross and directing the material upwardly therefrom; shredding means disposed generally above said pickup means for receiving material therefrom, said shredding means having a plurality of stationary blades and a plurality of shredder blades mounted on a transversely extending shaft rotatably mounted in said housing, said blades mounted on said shaft being cooperative with said stationary blades for shredding the crop material; consolidating means disposed adjacent said shredding means and adapted to receive material therefrom and comprising a transversely extending pan having an opening disposed centrally therein and a pair of augers rotatably mounted in said housing above said pan for moving material inwardly toward said central opening; and collecting means including a rearwardly extending tube having an opening at the inner end thereof coextensive with the opening in said pan, a compacting auger rotatably mounted in said tube and packaging means disposed about the outer end of said tube for receiving the compacted material.

2. Mobile apparatus, as recited in claim 1, wherein said pickup means comprises a plurality of flail elements rotatably about a shaft mounted in said housing to sever and lift material from the ground.

3. Mobile apparatus, as recited in claim 1, wherein said pickup means comprises brush elements rotatable about a shaft mounted in said housing for lifting material from the ground.

4. A grass and leaf-packaging machine adapted to pick up and package grass, leaves, and other similar material, comprising in combination: a wheel-supported housing; hitch means extending forwardly of said housing for attaching said machine to a prime mover; pickup means rotatably mounted in said housing for lifting material from the ground and directing the material to shredding means disposed in said housing upwardly and rearwardly of said pickup means, said shredding means comprising a plurality of stationary blades and a plurality of shredding blades mounted on a transversely extending shaft rotatably mounted in said housing; consolidating means disposed rearwardly of said shredding means for receiving shredded material therefrom and conveying the material inwardly of said housing, said consolidating means being disposed transversely to the direction of travel of said machine and comprising a pan mounted in said housing and extending inwardly therefrom, said pan having a central opening therein and a pair of augers rotatably mounted in said housing about said pan for moving material inwardly towards the central opening of said pan; collecting means extending rearwardly from said housing and disposed below the central opening in said pan, whereby material is delivered by said consolidating augers to the opening in said pan and into said collecting means where the material is compacted and packaged, said collecting means comprising a rearwardly extending tube having an opening at the inner end thereof coextensive with the opening in said pan, a compacting auger rotatably mounted in said tube, and packaging means connected to the outer end of said tube and clamping means on said tube for releasably connecting said packaging means to said tube.

5. A grass and leaf-packaging machine, as recited in claim 4, wherein said pickup means comprises a plurality of flail elements mounted for rotation with a transversely extending shaft rotatably mounted in said housing, said flail elements severing and lifting material from the ground for delivery to said shredding means.

6. A grass and leaf-packaging machine, as recited in claim 4, wherein said pickup means comprises a plurality of brush elements rotatably mounted on a transversely extending shaft.

7. Mobile apparatus for collecting grass and leaf material comprising, in combination, a wheel-supported housing, pickup means rotatably mounted in a forward portion of said housing for lifting material from the ground as the apparatus moves thereacross and delivering the material to shredding means disposed in said housing upwardly and rearwardly of said pickup means, said shredding means comprising a plurality of stationary blades and a plurality of shredder blades mounted on a transversely extending shaft rotatably mounted in said housing, consolidating means disposed rearwardly of said shredding means for receiving shredded material therefrom and conveying the material inwardly of said housing for delivery to a rearwardly extending collecting means wherein the material is compacted and packaged.

8. Mobile apparatus, as recited in claim 7, wherein said consolidating means is disposed transversely to the direction of travel of said apparatus over the ground and comprises a pan mounted in said housing and extending inwardly therefrom, said pan having a central opening therein, and a pair of augers rotatably mounted in said housing above said pan for moving material inwardly toward the central opening of said pan.

9. Mobile apparatus, as recited in claim 8, wherein said collecting means extends rearwardly from said housing and is disposed below the central opening in said pan whereby material is delivered by said consolidating augers to the opening in said pan and into said collecting means where the material is compacted and packaged.

10. Mobile apparatus, as recited in claim 9, wherein said collecting means comprises a rearwardly extending tube having an opening at the inner end thereof coextensive with the opening in said pan, a compacting auger rotatably mounted in said tube, packaging means connected to the outer end of said tube and clamping means on said tube for releasably connecting said packaging means to the tube.

11. Mobile apparatus, as recited in claim 7, wherein said pickup means comprises a plurality of flail elements mounted for rotation with a transversely extending shaft rotatably mounted in said housing, said flail elements severing and lifting material from the ground for delivery to said shredding means.

12. Mobile apparatus, as recited in claim 7, wherein said pickup means comprises a plurality of brush elements rotatably mounted on a transversely extending shaft.

* * * * *